United States Patent
Fang et al.

(10) Patent No.: US 9,563,257 B2
(45) Date of Patent: Feb. 7, 2017

(54) DYNAMIC ENERGY-SAVING METHOD AND APPARATUS FOR PCIE DEVICE, AND COMMUNICATION SYSTEM THEREOF

(71) Applicant: Huawei Technologies Co., Ltd., Shenzhen, Guangdong (CN)

(72) Inventors: Qingyin Fang, Shenzhen (CN); Chaoping Qiu, Shenzhen (CN); Qiangzhi Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 14/016,786

(22) Filed: Sep. 3, 2013

(65) Prior Publication Data
US 2014/0019788 A1    Jan. 16, 2014

Related U.S. Application Data

(63) Continuation of application No. PCT/CN2012/083486, filed on Oct. 25, 2012.

(30) Foreign Application Priority Data

Apr. 18, 2012   (CN) .......................... 2012 1 0114678

(51) Int. Cl.
*G06F 1/32* (2006.01)
*G06F 1/00* (2006.01)
*G06F 1/26* (2006.01)

(52) U.S. Cl.
CPC ............. *G06F 1/3253* (2013.01); *G06F 1/325* (2013.01); *Y02B 60/1235* (2013.01); *Y02B 60/32* (2013.01)

(58) Field of Classification Search
CPC ..................................... G06F 1/32; G06F 1/26
USPC ......................................................... 713/323
See application file for complete search history.

(56) References Cited

U.S. PATENT DOCUMENTS

| 2004/0210778 | A1 | 10/2004 | Naveh et al. | |
| 2005/0144487 | A1* | 6/2005 | Puffer et al. | 713/300 |
| 2006/0041611 | A1 | 2/2006 | Fujita et al. | |
| 2006/0184809 | A1* | 8/2006 | Kojou et al. | 713/300 |
| 2006/0262839 | A1* | 11/2006 | Tseng et al. | 375/219 |
| 2006/0277344 | A1* | 12/2006 | Yasui et al. | 710/305 |

(Continued)

FOREIGN PATENT DOCUMENTS

| CN | 1737728 A | 2/2006 |
| CN | 1768318 A | 5/2006 |

(Continued)

*Primary Examiner* — Phil Nguyen
(74) *Attorney, Agent, or Firm* — Leydig, Voit & Mayer, Ltd.

(57) ABSTRACT

The present disclosure is applicable to the field of device energy-saving control, and provides a dynamic energy-saving method and apparatus for a PCIE device, and a communication system thereof. The method includes: obtaining a system energy-saving policy; and using a PCIE energy-saving module to control a PCIE device and a PCIE link to enter a corresponding linkage energy-saving state according to the obtained system energy-saving policy. In the present disclosure, a "D" state of a PCIE device is associated with an "L" state of a link into a new linkage energy-saving state, and the device and the link are controlled to enter the corresponding linkage energy-saving state according to a preset energy-saving policy, thereby improving energy-saving efficiency.

7 Claims, 3 Drawing Sheets

(56) References Cited

U.S. PATENT DOCUMENTS

| | | | |
|---|---|---|---|
| 2007/0025492 A1 | | 2/2007 | Canagasaby et al. |
| 2007/0050653 A1 | * | 3/2007 | Verdun |
| 2008/0147938 A1 | * | 6/2008 | Freimuth et al. ............. 710/105 |
| 2009/0043941 A1 | * | 2/2009 | Brahmaroutu ................ 710/314 |
| 2009/0249103 A1 | | 10/2009 | Jeyaseelan et al. |
| 2010/0081406 A1 | * | 4/2010 | Tan et al. ..................... 455/218 |
| 2012/0082463 A1 | * | 4/2012 | Kasprzyk ..................... 398/140 |

FOREIGN PATENT DOCUMENTS

| | | |
|---|---|---|
| CN | 101159649 A | 4/2008 |
| CN | 101204052 A | 6/2008 |
| CN | 101526846 A | 9/2009 |
| CN | 101598969 A | 12/2009 |
| CN | 101788844 A | 7/2010 |
| CN | 102662458 A | 9/2012 |
| EP | 1975763 A2 | 10/2008 |

\* cited by examiner

DYNAMIC ENERGY-SAVING METHOD AND APPARATUS FOR PCIE DEVICE, AND COMMUNICATION SYSTEM THEREOF

CROSS-REFERENCE TO RELATED APPLICATIONS

This application is a continuation of International Patent Application No. PCT/CN2012/083486, filed on Oct. 25, 2012, which claims priority to Chinese Patent Application No. 201210114678.3, filed on Apr. 18, 2012, both of which are hereby incorporated by reference in their entireties.

TECHNICAL FIELD

The present disclosure relates to the field of device energy-saving control and, in particular, to a dynamic energy-saving method and apparatus for a PCIE device, and a communication system thereof.

BACKGROUND

The PCI (Peripheral Component Interconnect) bus emerged in the early 1990s when a broad range of IO (input/output) buses existed in the PC (personal computer) field, such as a VESA (Video Electronics Standards Association) local bus, an EISA (Extended Industry Standard Architecture) bus, and an ISA (Industry Standard Architecture) bus. At the earliest stage, the PCI emerged in place of the ISA bus. In that period, a 33 MHz (megahertz) PCI bus fully satisfied the data transmission application. With the rapid increase of the processing capability of a processor and the read and write speeds of the memory, the PCI bus quickly evolved from a 33 MHz PCIE bus to a 66 MHz PCIE (PCI-Express) bus. The PCIE device is widely adopted in the IT (information technology) field, especially the PCIE graphics card is applied massively. The energy-saving research of the PCIE device is one of the current hot topics.

Currently, the PICE energy-saving technology includes two energy-saving modes: power management (PM) and link active-state power management (ASPM). A power management state "D" of a PCIE device and a power management state "L" of a PCIE link are defined. In an actual use process, the two energy-saving modes, that is, a PCIE device enters the power management state D and a PCIE link enters the power management state L, are implemented independently, and the overall energy-saving efficiency is not high.

SUMMARY

Embodiments of the present disclosure provide a dynamic energy-saving method for a PCIE device to improve energy-saving efficiency.

The embodiments of the present disclosure are implemented in the following way: A dynamic energy-saving method for a PCIE device includes the following steps:

obtaining a system energy-saving policy; and using a PCIE energy-saving module to control a PCIE device and a PCIE link to enter a corresponding linkage energy-saving state based on the obtained system energy-saving policy.

An embodiment of the present disclosure further provides a dynamic energy-saving apparatus for a PCIE device, where the apparatus includes:

a policy setting obtaining unit, configured to obtain a system energy-saving policy; and an energy-saving state controlling unit, configured to use a PCIE energy-saving module to control a PCIE device and a PCIE link to enter a corresponding linkage energy-saving state based on the obtained system energy-saving policy.

An embodiment of the present disclosure further provides a PCIE communication system, including the dynamic energy-saving apparatus for a PCIE device.

The present disclosure brings the following beneficial effects: in the present disclosure, a D state of a PCIE device is associated with an L state of a link into a new linkage energy-saving state, and the device and the link are controlled to enter the corresponding linkage energy-saving state according to a preset energy-saving policy, thereby improving energy-saving efficiency.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following descriptions show merely some of the embodiments described in the present application, and persons of ordinary skill in the art may still obtain other drawings from the accompanying drawings.

DESCRIPTION OF EMBODIMENTS

To make the objectives, technical solutions, and advantages of the present disclosure more comprehensible, the following further describes the present disclosure in detail with reference to the accompanying drawings and embodiments. It is understandable that the specific embodiment is only used to explain the present disclosure and is not intended to limit the present disclosure.

Figure 1:
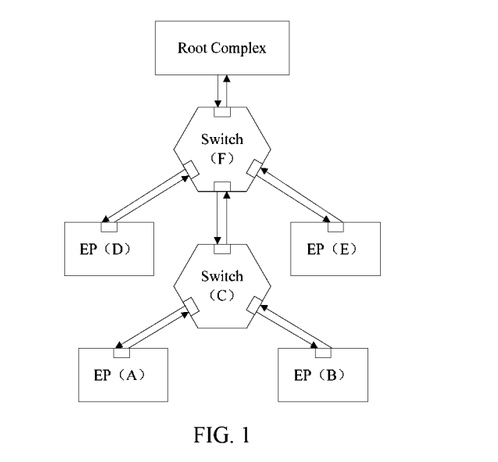
FIG. 1 is a connection diagram of a PCIE device and a root complex, according to one example.

A PCIE device described in the embodiments of the present disclosure refers to a device based on a PCIE bus, and is generally referred to as an EP (Endpoint). In most processor systems, the PCIE device is extended by being connected to a root complex (Root Complex) through a switch (Switch). The root complex has one or more PCIE ports, and may be connected to various PCIE devices. FIG. 1 is a connection diagram of a PCIE device and a root complex, where four PCIE devices (for example, EP(A), EP(B), EP(D), and EP(E)) are connected to the root complex through two switches (for example, Switch(C) and Switch (F)). A link between the PCIE device and the switch, a link between switches, and a link between the switch and the root complex are all called PCIE links.

The following uses specific embodiments to describe the technical solution of the embodiments of the present disclosure.

Embodiment 1

In the following, power management (PM) and link active-state power management (ASPM) are defined in detail in an embodiment of the present disclosure, and the definitions are exemplary. In actual application, such definition is included, but not limited, and persons skilled in the art may obtain definitions of other states according to the description of the embodiment of the present disclosure. A power management state D of a PCIE device and a power management state L of a PCIE link in the examples given in the present disclosure are defined in the following two tables:

TABLE 1

| State | Description |
|---|---|
| D0 | Fully active, mandatory, with the device fully powered, with all functions |
| D1 | Lowly dormant, optional |
| D2 | Deeply dormant, optional |
| D3hot | Fully inactive, mandatory, with the device still powered (Vcc), entering this state according to a software command |
| D3cold | Fully inactive, mandatory, with the device powered off (Vcc), exiting this state upon wakeup or basic reset |

The D0 state and the D3 states (D3hot and D3cold) herein are necessarily supported by all PCIE devices, and the D1 state and the D2 state are optional states of the PCIE device and depend on whether the hardware supports the two states.

TABLE 2

Link state definition

| State | Description |
|---|---|
| L0 | Fully active |
| L0s | Standby |
| L1 | Standby at low power consumption |
| L2/L3 ready | Power-off stage |
| L2 | Dormant at low power consumption (still with an auxiliary power supply retained), where the auxiliary power supply Vaux is required for waking up the logical part |
| L3 | Power off |

The PM can control the PCIE link to enter or exit the L1, L2 and L3 energy-saving states according to the state of the devices on both sides of the PCIE link, and control the device (that is, a chip or a corresponding module) to enter or exit the D1, D2, D3hot, and D3cold states. According to the set system energy-saving policy of the software, the ASPM may negotiate entering an L0s state (or L1 state, depending on link hardware support) when the PCIE link has no data for receiving or sending. Even if the device is in the D0 state, the energy-saving objective can be further accomplished.

Figure 2:
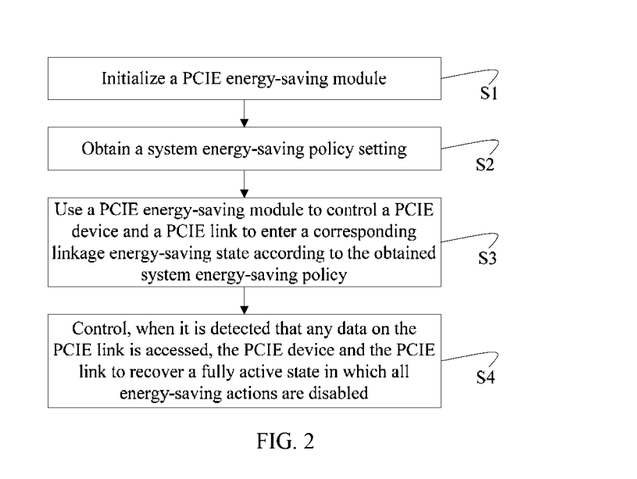
FIG. 2 is a flowchart of a dynamic energy-saving method for a PCIE device according to Embodiment 1 of the present disclosure.

FIG. 2 is a flowchart of a dynamic energy-saving method for a PCIE device according to Embodiment 1 of the present disclosure. For ease of description, only the part related to the embodiment of the present disclosure is shown.

In step S1, a PCIE energy-saving module is initialized.

The initialized state of the PCIE energy-saving module may be set as required. For example, the initialized state may be defined as a non energy-saving state, or the initialized state is defined as a highly energy-saving state.

In the embodiment of the present disclosure, the PCIE energy-saving module is a software control program that controls a PCIE device and a PCIE link to enter a corresponding linkage energy-saving state.

In step S2, a set system energy-saving policy is obtained.

In the embodiment of the present disclosure, before the set system energy-saving policy is obtained, it is obtained whether the device hardware supports each energy-saving state. The system energy-saving policy is set by a user through dynamic energy-saving management platform (DESP) software according to actual energy-saving requirements. The system energy-saving policy herein includes four levels: non energy-saving state G0, lowly energy-saving state G1, moderately energy-saving state G2, and highly energy-saving state G3, depending on the extent of energy-saving and arranged in descending order.

In step S3, the PCIE energy-saving module is used to control a PCIE device and a PCIE link to enter a corresponding linkage energy-saving state according to the obtained system energy-saving policy.

In the embodiment of the present disclosure, before the device enters the linkage energy-saving state, the PCIE link information and the active state are scanned, and the configuration information of the PCIE device is obtained so that the system knows the connection relationship of each PCIE device and the specific energy-saving policy selected for the device. Afterward, the system invokes the PCIE energy-saving module to control the PCIE device and the PCIE link to enter the corresponding linkage energy-saving state according to the set system energy-saving policy.

In a specific implementation process, other levels of the linkage state may be defined as needed. For example, the linkage state is defined into 4 levels only: (PCIE device "on", PCIE link "on"), (PCIE device "on", PCIE link "off"), (PCIE device "off", PCIE link "on"), and (PCIE device "off", PCIE link "off"). The number of levels is not limited herein.

As an embodiment herein, the linkage state is defined into 6 levels: P0, P0_L0s, P0_L1, P1, P2, and P3. Each level of the state is described below:

When the state is P0, the PCIE device is in a normal working state D0, and the PCIE link is in a fully active state L0. The D0 state is subdivided into a "D0un-initialized" state and a "D0active" state. When the device is powered on or reset, the initial state is D0un-initialized; when the software finishes relevant configuration and initialization, the device enters a D0active state, that is, normal working state. When the device is in the normal working state D0, the link rate (2.5 GT/s (gigatransfers per second) or 5 GT/s) and the link data channel width, which is generally 4×, 8×, and 16× channel width, and so on, are negotiated at the time of initialization according to software configuration, hardware support capabilities, and link data traffic.

When the state is P0_L0s, the PCIE device is in a normal working state D0, and the PCIE link is in a standby state L0s. This state is more energy-saving than the P0 state. With the active-state power management (ASPM) enabled, the link enters the standby state L0s in an idle period. Under the L0s state, data exchange is disabled but without turning off any primary power supply, reference clock, or internal PLL (phase lock loop) loop. This state may be regarded as a preliminary power saving state. Under the P0_L0s state, switching of the link state is implemented by the hardware automatically. The delay of switching the link from the state L0s back to the normal state L0 is extremely short, and is approximately 64 ns to 4 us.

When the state is P0_L1, the PCIE device is in a normal working state D0, and the PCIE link is in a low-power-consumption standby state L1. This state is more energy-saving than the P0_L0s state. Under the support of hardware, the link may enter the standby state L1 in the idle period by enabling active-state power management (ASPM). For the ASPM, the low-power-consumption standby state L1 is optional. Therefore, the P0_L1 state does not work unless it is supported by the corresponding device hardware. Under the L1 state, the primary power supply and the reference clock need to be maintained "on," but the internal PLL loop may be turned off to further save electricity. Obviously, the delay of switching the link from L1 back to L0 is longer than the delay of switching the link from L0s back to L0, and is generally 4 us to 64 us.

When the state is P1, the PCIE device is in a lowly dormant state D1, and the PCIE link is in a low-power-consumption standby state L1. This state is more energy-saving than the P0_L1 state. Because the state D1 is optional, the PCIE device does not enter the lowly dormant state D1 unless supported by hardware, and enters the state under control of software. Before it enters the state, the software needs to perform state backup for the purpose of wakeup and recovery. Under the D1 state, the PCIE device processes only TLP protocol words. The device enters this state when idle, and controls the link to enter the L1 state.

When the state is P2, the PCIE device is in a deep dormant state D2, and the PCIE link is in a low-power-consumption standby state L1. This state is more energy-saving than the P1 state. Because the state D2 is optional, the PCIE device does not enter the deep dormant state D2 unless supported by hardware, and enters the state under control of software. Before it enters the state, the software needs to perform state backup for the purpose of wakeup and recovery. Under the D2 state, the PCIE device processes only TLP protocol words.

When the state is P3, the PCIE device is in a hot power-off state D3hot, and the CIE link is in a low-power-consumption standby state L1 or a power-off stage L2/L3 ready. This state is more energy-saving than P2, and is a deep energy-saving state. The software does not need to perform state backup before the device enters the software, but needs to start over an initialization process at the time of wakeup.

In step S4, when it is detected that any data on the PCIE link is accessed, the PCIE device and the PCIE link are controlled to recover a fully active state in which all energy-saving actions are disabled.

In this embodiment, the time required for recovering the initial fully active state (that is P0 state) from each linkage energy-saving state differs. If a state is more energy-saving, it takes longer time to recover the initial state from the state. The user selects a system energy-saving policy as required. In the embodiment of the present disclosure, energy-saving efficiency is improved as a whole.

Embodiment 2

It should be noted that, the system energy-saving policy may be set to other levels, for example, set to three state levels: "on," "off," and "energy-saving;" or may be set to other forms, which are not limited herein.

Figure 3:
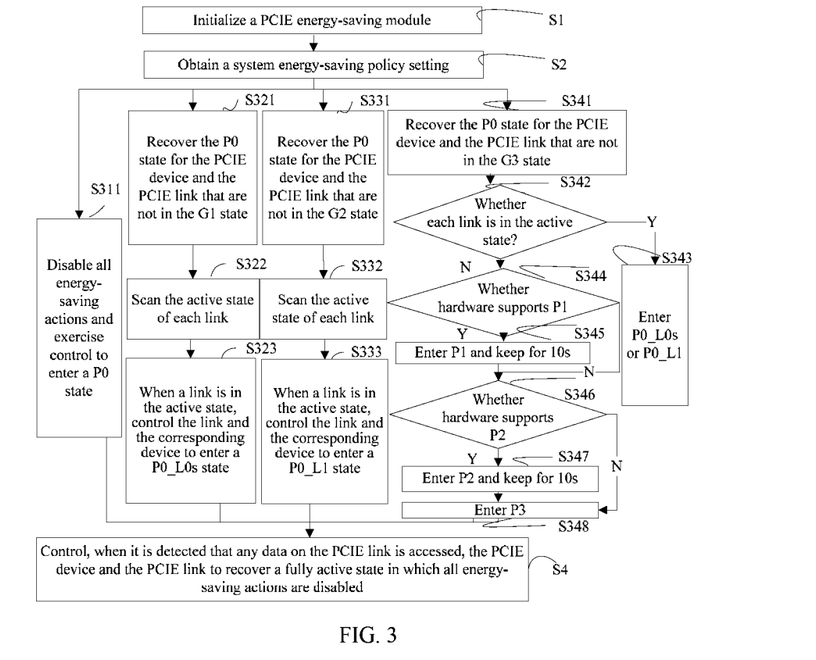
FIG. 3 is a flowchart of a dynamic energy-saving method for a PCIE device according to Embodiment 2 of the present disclosure.

For example, the following describes a process of controlling a PCIE device and a PCIE link to enter a corresponding linkage energy-saving state in step S3 in this embodiment. System energy-saving policies include: non energy-saving state G0, lowly energy-saving state G1, moderately energy-saving state G2, and highly energy-saving state G3. As shown in FIG. 3:

In step S311, the obtained set system energy-saving policy is a non energy-saving state G0, and therefore, disable all energy-saving actions and control the PCIE device and the PCIE link to enter a P0 state. The method then proceeds to step S4.

In step S321, the obtained set system energy-saving policy is a lowly energy-saving state G1 and, therefore, recover the P0 state for the PCIE device and the PCIE link that are not in the G1 state. The method then proceeds to step S322.

In step S322, scan the active state of each link. The method then proceeds to step S323.

In S323, when a link is in the active state, control the link and the corresponding device to enter a P0_L0s state. The method then proceeds to step S4.

In step S331, the obtained set system energy-saving policy is a moderately energy-saving state G2 and, therefore, recover the P0 state for the PCIE device and the PCIE link that are not in the G2 state. The method then proceeds to step S332.

In step S332, scan the active state of each link. The method then proceeds to step S333.

In step S333, when a link is in the active state, control the link and the corresponding device to enter a P0_L1 state. The method then proceeds to step S4.

In step S341, the obtained set system energy-saving policy is a highly energy-saving state G3 and, therefore, recover the P0 state for the PCIE device and the PCIE link that are not in the G3 state. The method then proceeds to step S342.

In step S342, scan is performed to determine whether each link is in the active state. If yes, the method proceeds to step S343.

In step S343, when a link is in the active state, control the link and the corresponding device to enter a P0_L1 or P0_L1 state.

If no at step S342, the method proceeds to step S344. In step S344, when a link is electrically idle, determine whether hardware supports the P1 state; if the hardware does not support the P1 state, proceed to step S346. If yes, proceed to step S345.

In step S345, the hardware supports the P1 state, and therefore, exercise control to enter the P1 state and keep steady (for example, keep for 10 seconds). The method then proceeds to step S346.

In step S346, determine whether hardware supports the P1 state; if the hardware does not support the P1 state, proceed to step S348. If yes, proceed to step S347.

In step S347, the hardware supports the P2 state, and therefore, exercise control to enter the P2 state and keep steady (for example, keep for 10 seconds). The method then proceeds to step S348.

In step S348, control the PICE device and the PCIE link to enter the P3 state. The method then proceeds to step S4.

In the embodiment of the present disclosure, energy-saving efficiency is improved as a whole.

Embodiment 3

Figure 4:
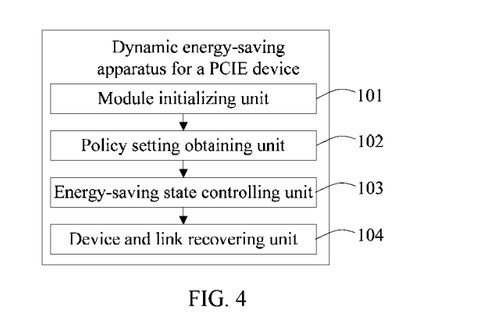
FIG. 4 is a structural block diagram of a dynamic energy-saving apparatus for a PCIE device according to Embodiment 3 of the present disclosure.

FIG. 4 shows a structure of a dynamic energy-saving apparatus for a PCIE device according to Embodiment 3 of the present disclosure. For ease of description, only the part related to the embodiment of the present disclosure is shown.

A dynamic energy-saving apparatus for a PCIE device includes:

a policy setting obtaining unit 102, configured to obtain a set system energy-saving policy; and an energy-saving state controlling unit 103, configured to use a PCIE energy-saving module to control a PCIE device and a PCIE link to enter a corresponding linkage energy-saving state according to the obtained system energy-saving policy.

Further, in some implementations, the apparatus further includes:

a module initializing unit 101, configured to initialize the PCIE energy-saving module.

Further, in some implementations, the apparatus further includes:

a device and link recovering unit 104, configured to: when it is detected that any data on a PCIE link is accessed, control the PCIE device and the PCIE link to recover a fully active state in which all energy-saving actions are disabled.

Further, the energy-saving state controlling unit includes:

a first controlling unit, configured to disable all energy-saving actions and control the PCIE device and the PCIE link to enter a P0 state if the system energy-saving policy is a non energy-saving state G0;

a second controlling unit, configured to: if the system energy-saving policy is a lowly energy-saving state G1, recover the P0 state for the PCIE device and the PCIE link that are not in the G1 state first, and then scan an active state of each link, and control the link to enter a P0_L0s state if the link is in the active state;

a third controlling unit, configured to: if the system energy-saving policy is a moderately energy-saving state G2, recover the P0 state for the PCIE device and the PCIE link that are not in the G2 state first, and then scan an active state of each link, and control the link to enter a P0_L1 state if the link is in the active state; and a fourth controlling unit, configured to: if the system energy-saving policy is a highly energy-saving state G3, recover the P0 state for the PCIE device and the PCIE link that are not in the G3 state first, and then scan an active state of each link, and control the link to enter a P3 state if the link is in an electrically idle state, where the system energy-saving policy includes 4 levels, that is, non energy-saving state G0, lowly energy-saving state G1, moderately energy-saving state G2, and highly energy-saving state G3, where the G0 corresponds to the P0 state, the G1 corresponds to the P0_L0s state, the G2 corresponds to the P0_L1 state, and the G3 corresponds to the P3 state;

levels of states of the P0, P0_L0s, P0_L1, P1, P2, and P3 are detailed below:

when the state is P0, the PCIE device is in a normal working state D0, and the PCIE link is in a fully active state L0;

when the state is P0_L0s, the PCIE device is in a normal working state D0, and the PCIE link is in a standby state L0s;

when the state is P0_L1, the PCIE device is in a normal working state D0, and the PCIE link is in a low-power-consumption standby state L1;

when the state is P1, the PCIE device is in a lowly dormant state D1, and the PCIE link is in a low-power-consumption standby state L1;

when the state is P2, the PCIE device is in a deep dormant state D2, and the PCIE link is in a low-power-consumption standby state L1; and when the state is P3, the PCIE device is in a hot power-off state D3hot, and the CIE link is in a low-power-consumption standby state L1 or a power-off stage L2/L3 ready.

In the embodiment of the present disclosure, a D state of a PCIE device is associated with an L state of a link into a new linkage energy-saving state; besides, several system energy-saving policies are defined; after the user selects a proper energy-saving policy, the PCIE device and the PCIE link are controlled to enter a corresponding linkage energy-saving state on a proper occasion, thereby implementing dynamic energy-saving of the PCIE device and the PCIE link, and improving overall energy-saving efficiency.

Embodiment 4

Figure 5:
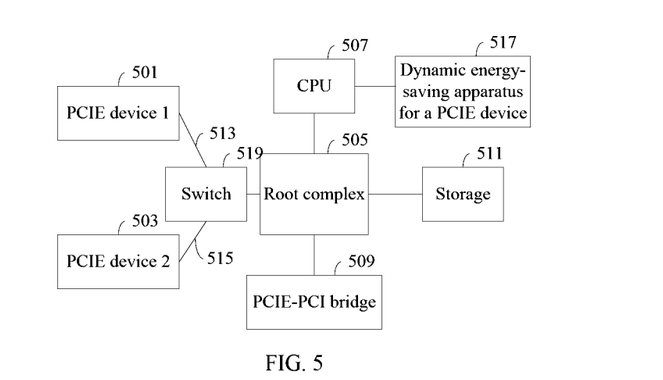
FIG. 5 is a schematic structural diagram of a PCIE communication system according to Embodiment 4 of the present disclosure.

FIG. 5 shows a PCIE communication system, including a dynamic energy-saving apparatus 517 for a PCIE device, which is described in Embodiment 3 of the present disclosure. The apparatus includes: a policy setting obtaining unit, configured to obtain a set system energy-saving policy; and an energy-saving state controlling unit, configured to use a PCIE energy-saving module to control a PCIE device and a PCIE link to enter a corresponding linkage energy-saving state according to the obtained system energy-saving policy.

The system further includes:

a PCIE device 501, which is an endpoint device (Endpoint) connected with a switch 519 through a link 513, where the switch 519 is connected with a root complex 505;

a PCIE device 503, which is an endpoint device (Endpoint) connected with the switch 519 through a link 515, where the switch 519 is connected with the root complex 505;

a CPU 507, connected with the root complex 505;

a storage 511, connected with the root complex 505;

a PCIE-PCI bridge 509, enabling the system to be compatible with a PCI device; and a dynamic energy-saving apparatus 517 for a PCIE device, connected with the CPU 507, and configured to obtain a set system energy-saving policy, and use the PCIE energy-saving module to control the PCIE device 501 or the PCIE device 503 and the link 513 or the link 515 to enter a corresponding linkage energy-saving state according to the obtained system energy-saving policy. The dynamic energy-saving apparatus for a PCIE device may also be set in a CPU, or deployed in another circuit unit, which is not limited in the embodiment of the present disclosure. According to the embodiment of the present disclosure, a device and a link may be controlled to enter a corresponding linkage energy-saving state based on a preset energy-saving policy to improve energy-saving efficiency.

The solution of the present disclosure may be described in an ordinary context of computer-executable instructions executed by a computer, for example, in a program unit. Generally, the program units include a routine, a program, an object, a component, a data structure, and so on, for executing a specific task or implementing a specific abstract data type. The solution of the present disclosure may also be practiced in a distributed computing environment. In the distributed computing environment, a remote processing device connected through a communication network executes tasks. In the distributed computing environment, the program unit may be located in a local or remote computer storage medium such as a storage device.

The embodiments in this specification are all described in a progressive manner, mutual reference may be made to the same or similar part of the embodiments, and each embodiment focuses on illustrating difference from other embodiments. In particular, for the apparatus embodiment, since it is basically similar to the method embodiment, the apparatus embodiment is described simply, and the relevant part may be obtained with reference to the part of the description of the method embodiment. The described apparatus embodiments are merely exemplary, where, the units described as separate parts may or may not be physically separate, and parts displayed as units may or may not be physical units, may be located in one position, or may be distributed on a plurality of network elements. A part of or all of the modules may be selected according to the actual needs to achieve the objectives of the solutions of the embodiments. Persons of ordinary skill in the art may understand and implement the embodiment without creative efforts.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners For example, the described apparatus embodiment is merely exemplary. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or part of the technical solutions may be implemented in the form of a software product. The computer software product is stored in a storage medium, and includes several instructions for instructing a computer device (which may be a personal computer, a server, or a network device and so on) to perform all or a part of the steps of the method described in the embodiment of the present disclosure. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

Based on the descriptions of the foregoing implementation manners, persons skilled in the art can clearly understand that the present disclosure can be implemented through software and necessary general-purpose hardware. The general-purpose hardware includes general-purpose integrated circuits, general-purpose CPUs, general-purpose storages, general-purpose components, and so on. Assuredly, the present disclosure can also be implemented through special-purpose hardware, including special-purpose integrated circuits, special-purpose CPUs, special-purpose storages, special-purpose components, and so on. However, in many circumstances, the former implementation manner is preferred. Based on such an understanding, the technical solutions of the present disclosure or the part that makes contributions to the prior art can be substantially embodied in the form of a software product. The computer software product may be stored in a readable storage medium, for example, a floppy disk, a hard disk, or an optical disk of the computer, and contain several instructions used to instruct a computer device (for example, a personal computer, a server, or a network device) to perform the method according to the embodiments of the present disclosure.

The foregoing descriptions are merely exemplary embodiments of the present disclosure, but are not intended to limit the present disclosure. Any modifications, equivalent substitutions, and improvements made within the spirit and principle of the present disclosure shall fall within the protection scope of the present disclosure.

What is claimed is:

1. An energy-saving method for a PCIE (Peripheral Component Interconnect-Express) device, the method comprising:
    obtaining a system energy-saving policy; and
    using a PCIE energy-saving module to control a PCIE device and a PCIE link to enter a corresponding linkage energy-saving state based on the obtained system energy-saving policy, wherein the linkage energy-saving state comprises P0, P0_L0s, P0_L1, P1, P2, or P3, wherein:
        when the state is P0, the PCIE device is in a normal working state D0, and the PCIE link is in a fully active state L0,
        when the state is P0_L0s, the PCIE device is in the normal working state D0, and the PCIE link is in a standby state L0s,
        when the state is P0_L1, the PCIE device is in the normal working state D0, and the PCIE link is in a low-power-consumption standby state L1,
        when the state is P1, the PCIE device is in a lowly dormant state D1, and the PCIE link is in the low-power-consumption standby state L1,
        when the state is P2, the PCIE device is in a deep dormant state D2, and the PCIE link is in the low-power-consumption standby state L1, and
        when the state is P3, the PCIE device is in a hot power-off state D3hot, and the PCIE link is in the low-power-consumption standby state L1 or a power-off stage L2/L3 ready;
    wherein entering the P3 state comprises:
        controlling, if the PCIE device supports the P1 state, the PICE device and the PCIE link to enter the P1 state and keep steady, and then controlling them to enter the P3 state, controlling, if the PCIE device supports the P2 state, the PICE device and the PCIE link to enter the P2 state and keep steady, and then controlling them to enter the P3 state, and controlling the PCIE device and the PCIE link to enter the P3 state directly if the PCIE device supports neither the P1 nor the P2 state.

2. The method according to claim 1, wherein before the step of obtaining a system energy-saving policy, the method further comprises:

initializing a PCIE energy-saving module.

3. The method according to claim 1, wherein the system energy-saving policy comprises: non energy-saving state G0, lowly energy-saving state G1, moderately energy-saving state G2, or highly energy-saving state G3, wherein the G0 corresponds to the P0 state, the G1 corresponds to the P0_L0s state, the G2 corresponds to the P0_L1 state, and the G3 corresponds to the P3 state.

4. The method according to claim 3, wherein the step of using a PCIE energy-saving module to control a PCIE device and a PCIE link to enter a corresponding linkage energy-saving state based on the obtained system energy-saving policy comprises:

if the system energy-saving policy is the non energy-saving state G0, disabling energy-saving actions and controlling the PCIE device and the PCIE link to enter the P0 state;

if the system energy-saving policy is the lowly energy-saving state G1, recovering the P0 state for the PCIE device and the PCIE link that are not in the G1 state first, and then scanning an active state of each PCIE link, and controlling the PCIE link to enter the P0_L0s state if the PCIE link is in the active state;

if the system energy-saving policy is the moderately energy-saving state G2, recovering the P0 state for the PCIE device and the PCIE link that are not in the G2 state first, and then scanning an active state of each PCIE link, and controlling the PCIE link to enter the P0_L1 state if the PCIE link is in the active state; and if the system energy-saving policy is the highly energy-saving state G3, recovering the P0 state for the PCIE device and the PCIE link that are not in the G3 state first, and then scanning an active state of each PCIE link, and controlling the PCIE link to enter the P3 state if the PCIE link is in an electrically idle state.

5. The method according to claim 4, wherein after the step of using a PCIE energy-saving module to control a PCIE device and a PCIE link to enter a corresponding linkage energy-saving state based on the obtained system energy-saving policy, the method further comprises:

controlling the PCIE device and the PCIE link to recover the P0 state upon detecting that any data on the PCIE link is accessed.

6. A dynamic energy-saving apparatus for a PCIE (Peripheral Component Interconnect-Express) device, comprising a processor and a computer-readable storage medium, the computer-readable storage medium having processor-executable instructions stored thereon, the processor-executable instructions including at least one module including:

a PCIE energy-saving module configured to control a PCIE device and a PCIE link to enter a corresponding linkage energy-saving state based on a system energy-saving policy, wherein the energy-saving state controlling module comprises:

a first controlling unit, configured to disable energy-saving actions and control the PCIE device and the PCIE link to enter a P0 state if the system energy-saving policy is a non energy-saving state G0, a second controlling unit, configured to: if the system energy-saving policy is a lowly energy-saving state G1, recover the P0 state for the PCIE device and the PCIE link that are not in the G1 state first, and then scan an active state of each PCIE link, and control the PCIE link to enter a P0_L0s state if the PCIE link is in the active state, a third controlling unit, configured to: if the system energy-saving policy is a moderately energy-saving state G2, recover the P0 state for the PCIE device and the PCIE link that are not in the G2 state first, and then scan the active state of each PCIE link, and control the PCIE link to enter a P0_L1 state if the PCIE link is in the active state, and a fourth controlling unit, configured to: if the system energy-saving policy is a highly energy-saving state G3, recover the P0 state for the PCIE device and the PCIE link that are not in the G3 state first, and then scan the active state of each PCIE link, and control the PCIE link to enter a P3 state if the PCIE link is in an electrically idle state;

wherein the system energy-saving policy comprises: non energy-saving state G0, lowly energy-saving state G1, moderately energy-saving state G2, or highly energy-saving state G3, wherein the G0 corresponds to the P0 state, the G1 corresponds to the P0_L0s state, the G2 corresponds to the P0_L1 state, and the G3 corresponds to the P3 state;

wherein when the state is P0, the PCIE device is in a normal working state D0, and the PCIE link is in a fully active state L0;

wherein when the state is P0_L0s, the PCIE device is in a normal working state D0, and the PCIE link is in a standby state L0s;

wherein when the state is P0_L1, the PCIE device is in a normal working state D0, and the PCIE link is in a low-power-consumption standby state L1;

wherein when the state is P1, the PCIE device is in a lowly dormant state D1 and the PCIE link is in a low-power-consumption standby state L1;

wherein when the state is P2, the PCIE device is in a deep dormant state D2, and the PCIE link is in a low-power-consumption standby state L1; and wherein when the state is P3, the PCIE device is in a hot power-off state D3hot, and the PCIE link is in a low-power-consumption standby state L1 or a power-off stage L2/L3 ready.

7. The apparatus according to claim 6, further comprising:

a device and PCIE link recovering unit, configured to, upon detecting that any data on a PCIE link is accessed, control the PCIE device and the PCIE link to recover a fully active state in which all energy-saving actions are disabled.

* * * * *